Figure 1:
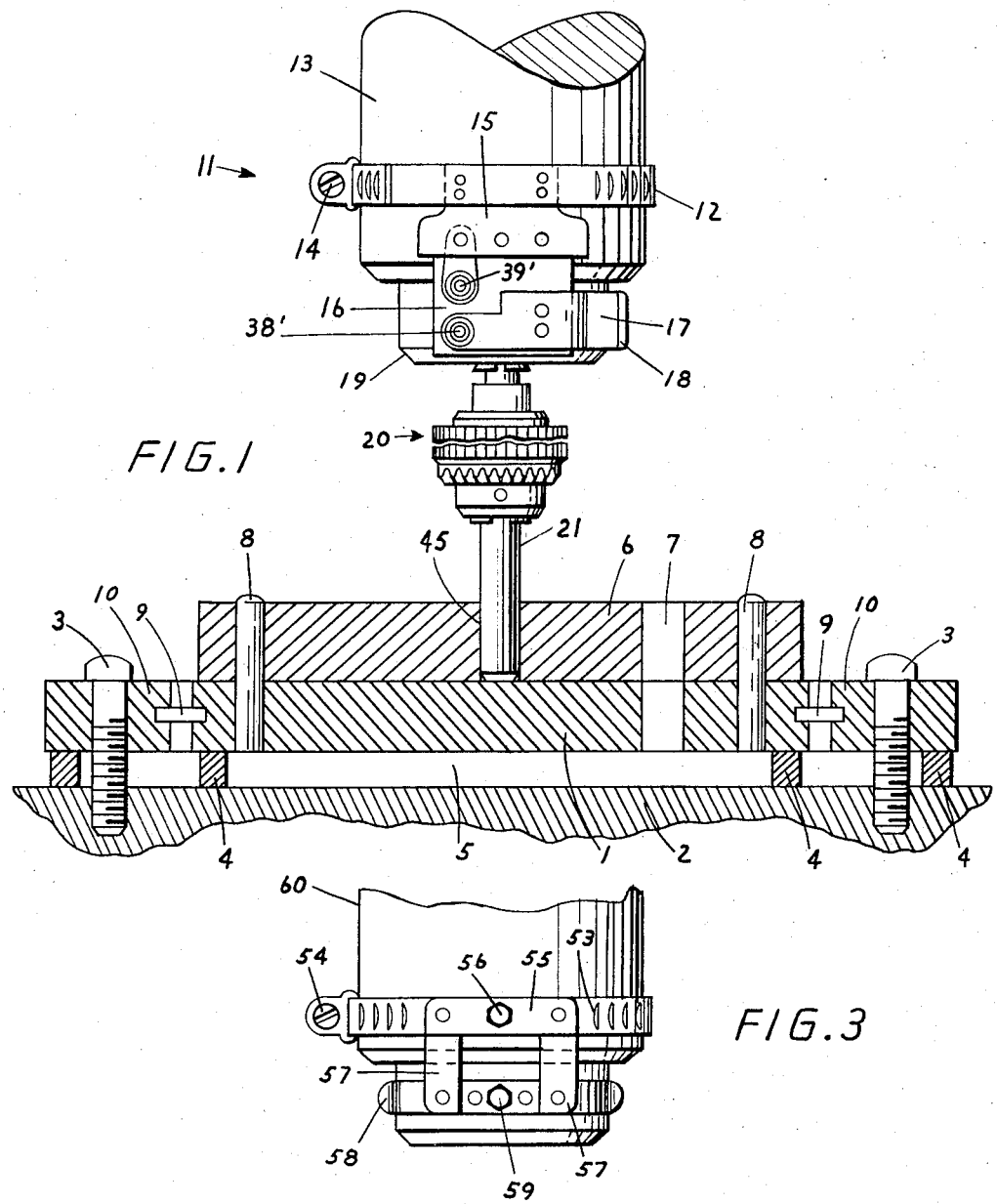

Jan. 27, 1959      A. J. HOUSMAN      2,870,540

ELECTRONIC CENTERING DEVICE

Filed April 1, 1955      3 Sheets-Sheet 1

INVENTOR
ABRAHAM J. HOUSMAN
BY
EZEKIEL WOLF
HIS ATTORNEY

Jan. 27, 1959

A. J. HOUSMAN 2,870,540

ELECTRONIC CENTERING DEVICE

Filed April 1, 1955

3 Sheets-Sheet 2

INVENTOR
ABRAHAM J. HOUSMAN
BY
EZEKIEL WOLF
HIS ATTORNEY

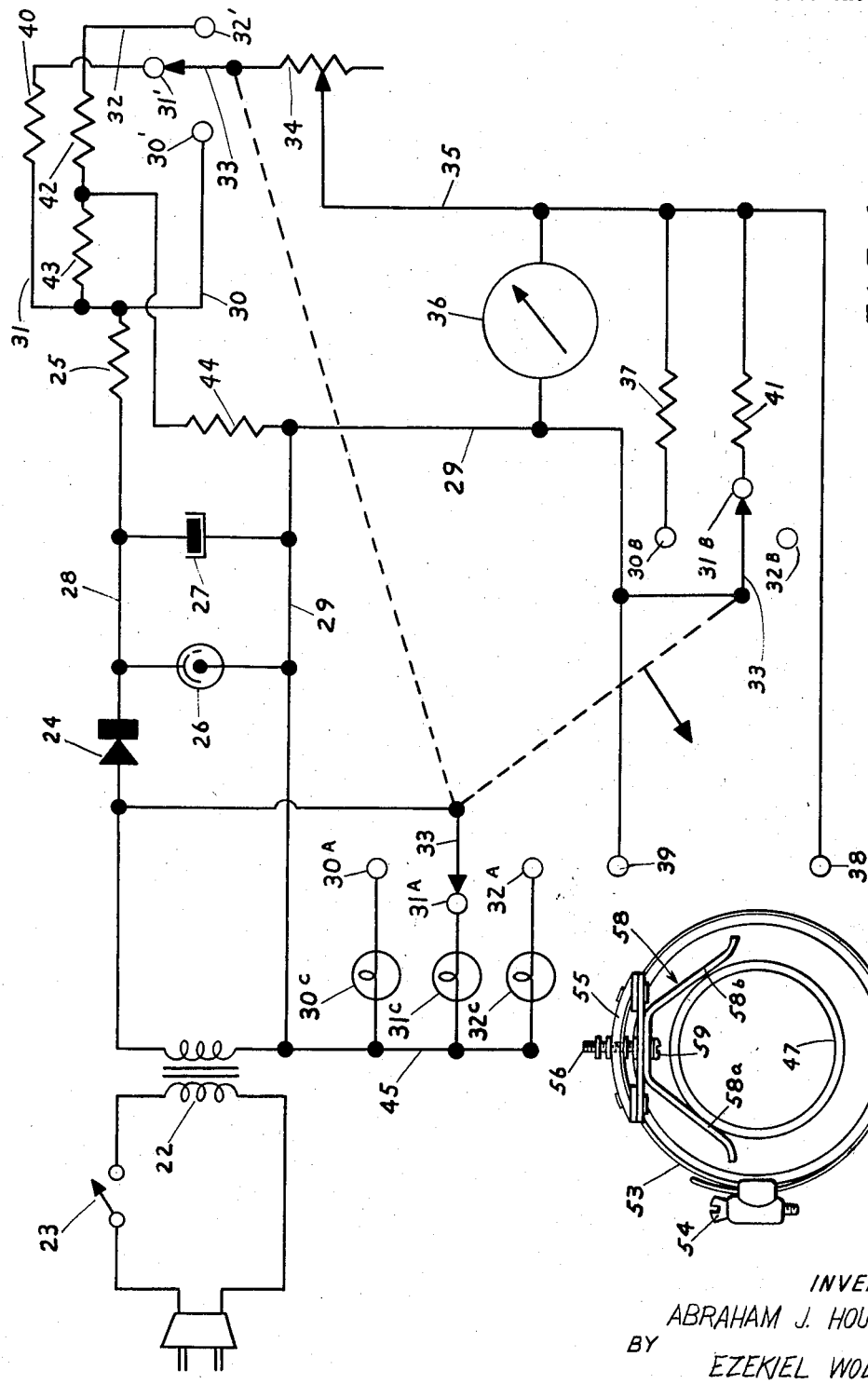

United States Patent Office 2,870,540
Patented Jan. 27, 1959

2,870,540

ELECTRONIC CENTERING DEVICE

Abraham J. Housman, Brookline, Mass.

Application April 1, 1955, Serial No. 498,645

14 Claims. (Cl. 33—172)

The present invention relates to an electronic device for accurately aligning the axis of the spindle of a drill press, lathe or similar machine with the axis of a hole, plugs, or pins in a die.

In the art of making piercing dies there are several ways which the female die and male punch holder may be formed. One common practice is to simultaneously drill the desired holes in these two elements by securing them together and then to harden one or both sections. This particular method is quite undesirable for several reasons, particularly because of the inaccuracies involved.

One of the preferred methods for such die manufacture is first to construct the female die with the desired holes drilled in their proper location. The female die is then used to position and align the holes for receiving the punches in the male punch holder. The particular method now in use however, takes a substantial length of time and and is quite painstaking in nature. Moreover, the results obtained are not always perfect, which results in the necessity of "staking" the punches in the male punch holder. This process of staking actually requires the displacement of the punch from one position to another by hitting it.

The substantial difficulties encountered in the processes set forth above, as well as the inaccuracies often resulting, particularly when the die utilizes a large number of punches, are overcome in the present invention.

In general, it is an object of the present invention to provide electrical means for aligning the axis of a machine spindle with the axis of a regularly shaped hole or projection, preparatory to machining or drilling.

It is therefore an object of the present invention to provide an electrical means for precisely locating the point at which a hole is to be drilled in a male punch holder.

Thus, in the present invention, a hole to be drilled in a male punch holder corresponding to the hole in the female die is located by placing the already formed female die over the male punch holder and temporarily securing it in place by means of locating pins projecting from the male punch holder. A centering plug attached to the spindle of the drilling machine on which the female die and male punch holder are located is then lowered into the hole of the female die and is rotated by the spindle. An electrical circuit having a measuring meter is connected to the drilling machine and plug. If the centering plug contacts the side of the hole in the female die there is an additional path through the circuit which will be indicated on the meter. If however, the centering plug is in the center of the hole in the female die, the side of this centering plug will be insulated from the side walls of the female dies and the circuit through the meter will remain unchanged and no reading will be seen. This condition indicates a proper centering. By proper adjustment of the plug, this condition may readily be obtained. After obtaining this condition, the female die is lifted from the male punch holder and the centering plugs in the spindle may be replaced with a drill. The hole may then properly be drilled without altering the properly located vertical alignment of the spindle with respect to the point to be drilled.

This process may then be repeated until the proper number of holes in the male punch holder have been formed.

In the preferable construction of this invention, the electrical circuit containing the meter has one lead connected to the spindle itself. When the spindle of the drilling machine is rotated, it is effectively insulated from the housing through the bearings which readily become covered with the oil packing. This insulation of the oil packing effectively keeps the circuit through the spindle open at all times unless the centering plug comes into contact with the sides of the female die at which time, this portion of the circuit will become grounded and will result in a changed reading on the meter.

Figure 2:
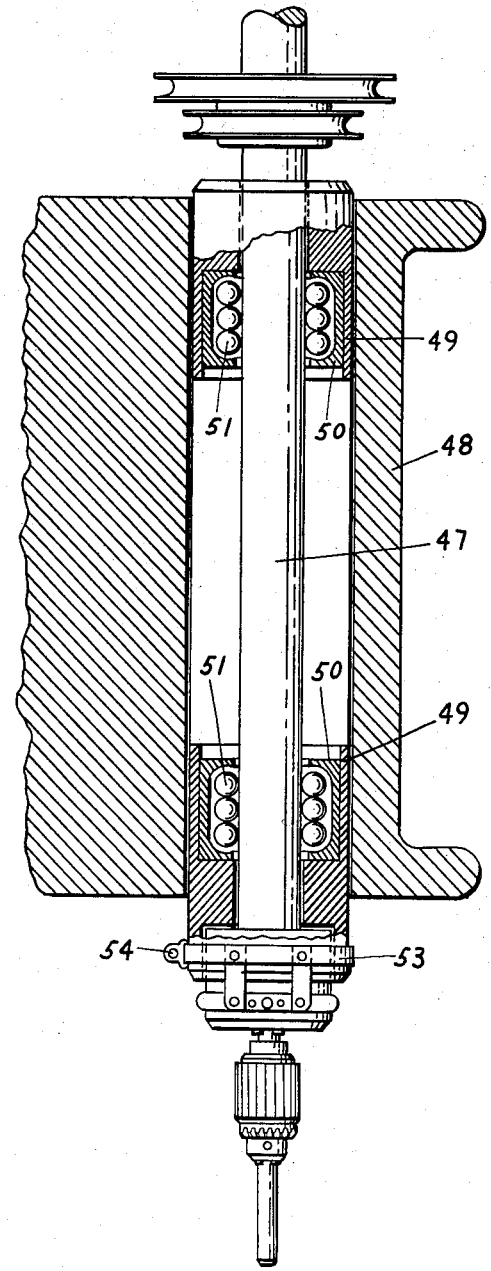

The operation and advantages of the present invention will be more clearly understood when considered in connection with the drawings, in which:

Figure 1 illustrates a partial cross sectional view of a male punch holder to be drilled, positioned under the female die with the spindle of a conventional drilling machine positioned above, Figure 2 is a partial cross sectional view of a drilling machine containing a portion of a preferred modification of the invention, Figure 3 illustrates an enlarged detail of Figure 2, Figure 4 illustrates schematically the electric wiring circuit of the invention, and Figure 5 illustrates a bottom view of the elements illustrated in Figure 3.

A specific and preferred embodiment of the invention for use in connection with a drilling machine or similar equipment is shown in the drawings. As illustrated the steel blank 1 from which the male punch holder is to be formed is mounted on the table 2 of the drilling machine. This steel blank is secured in position by bolts 3 passing through holes in the blank 1 into the table 2. This blank 1, is spaced from the surface of the table by a plurality of spacing bars 4 so as to permit sufficient clearance 5 between the bottom of the blank 1 and the table 2 for overdrilling of this steel blank. Positioned on top of the steel blank 1 is the female die 6 which has already had the desired holes 7 drilled in it and has also been hardened. To secure the female die 6 on the steel blank 1, locating pins 8, preferably two in number, are positioned in aligned holes in the female and male elements. The female die 6 and steel blank may be moved in all directions of a horizontal plane by calibrated micrometer controls (not shown). Positioned above the female die and attached to the housing, of the drilling machine spindle is a contact brush assembly generally designated 11. This assembly comprises a locking metal band 12, secured about the housing element 13 by tightening the screw 14. Attached to this band 12 is a metal apron 15 to which is secured an insulating plate 16. Secured in turn to this insulating plate 16 is the spring contact element 17 which is insulated from the housing 13 by the insulating plate 16. The end 18 of this spring contact 17 is pressed against the ball bearing mounted spindle 19. Secured to the bottom of the spindle 19 by means of a conventional chuck assembly 20 is a conductive centering plug 21, which may readily be removed from the chuck 20 and be replaced with a centering plug of a different size or with a drill. As the spindle 19 is ball bearing mounted its only electrical contact with the remaining portions of the machine and thus to ground are through the ball bearings. It has been found that there is little or no significance to the readings on the milli-ammeter when the spindle is not rotated while locating its position. It has been found, however, that during the operation of these machines, when the spindle is rotating quite rapidly, by applying a low voltage between the spindle and the female die 6, it is possible to indicate an average contact between the plug 21 and the female die 6 which is of course grounded to the machine.

The voltage may be applied and the degree of contact determined by a circuit schematically illustrated in Figure 4 where a supply voltage preferably from a 117 volt, 60 cycle A. C. supply source is impressed upon the primary of the transformer 22. This current may be controlled by a master switch 23 in the primary circuit. On the secondary side of the transformer the voltage is passed through selenium rectifier 24 and to a limiting resistor 25. A voltage regulator 26 and filter condenser 27 are shunted across the positive lead 28 and ground lead 29. From the limiting resistor 25 there are three leads 30, 31, and 32 through which the voltage may be passed ultimately to ground. The selection of the particular lead 30, 31, or 32 through which the voltage will pass, is controlled by the gang switch 33 which simultaneously controls and completes the corresponding contacts through the contact points 30', 31', 32', 30A, 31A, 32A, and 30B, 31B, 32B.

When the circuit is closed through the contact 30', a maximum voltage is passed through the rheostat 34 and the lead 35, the milliammeter 36 and shunt resistor 37 in parallel to the ground lead 29. The relationship of milliammeter 36 and shunt resistance 37 is such as to give a full scale deflection of the milliammeter scale when there is an open circuit between the contacts 38 and 39. When the circuit between the contacts 38 and 39 is closed the full scale deflection of the milliammeter 36 will be reduced in an inverse proportion dependent upon the resistance between the contacts 38 and 39.

If the circuit is completed by turning the contact 33 to the contact point 31', the voltage and current flowing through the limiting resistance 25 will pass through the series resistance 40, then through the rheostat 34. Simultaneously the switch 33 will contact the contact point 31B completing the path of the shunt resistance 41 across the lines 35 and 29. The relationship of the shunt resistance 41 and the resistance of the milliammeter 36 are such as to permit a full scale deflection on the milliammeter scale when the contact points 38 and 39 are open. As the shunt resistance 41 is relatively higher in value than the shunt resistance 37, the proportionate amount of current passing through the milliammeter 36 as compared with the resistance 41 will be greater. Thus, when a contact is made between the contact points 38 and 39, a more sensitive reading may be obtained upon the milliammeter scale. When the contact arm 33 is turned to the contact point 32', the current and voltage pass through the series resistor 42 and then to the rheostat 34 and line 35. Simultaneously the contact arm 33 turns to the contact point 32B. As this contact point 32B is an open terminal, full voltage and current will be impressed directly across the milliammeter 36 when the contact points 38 and 39 are open. Thus, when a contact is made between these points 38 and 39 the deflection on the milliammeter scale will be more sensitive than when the contact arm 33 is in either of the other two positions 30' or 31'.

Also incorporated into this circuit is a limiting voltage resistor 43 in series with a bleeder resistance 44, both of which are in shunt between the leads 28 and 29, providing a more accurate control of the voltage through the rheostat 34. As a means for determining the particular circuit through which the voltage is passed, light bulbs 30c, 31c, and 32c each corresponding respectively with the contact points 30', 31' and 32' are provided. Each of these lights are electrically connected through the leads 45 to the ground lead 29 of the terminal. At their other end, they are connected respectively to the terminals 30A, 31A and 32A. The gang switch 33 which is connected to the positive lead 28 preferably before the rectifier 24, selectively contacts and thereby lights the particular lamp selected, when a contact is made with the corresponding contact elements 30, 31 and 32. In the operation of the invention the contact 38 is connected electrically to the contact 38' and the contact 39 is connected electrically to the contact 39' on the contact brush assembly 11 of Figure 1. Thus, the contact 39 is always maintained at ground. The contact 38 is also shorted to ground when the drilling machine is not in use through the ball bearings supporting the spindle. When the spindle is rotated however, the ball bearings as previously mentioned are covered with a thin film of oil and the spindle is thereby insulated from the remainder of the machine. At this point, and before the plug 21 contacts any portion of the walls of the hole in the female die 6, the terminal 38 is open.

With the electric circuit in the coarse adjustment switch 33 contacting terminal 30' the female die 6 is positioned by moving the saddle mounted table until the plug is directly over the hole 46 with which it is to be aligned. At this point the plug 21 is lowered into the hole, by use of the conventional bar handle or other means provided on the drilling machine. As this plug 21 is up to .0015 inch smaller than the hole to which it fits it is ordinarily quite easy to accomplish this initial procedure. This plug, however, upon positioning in the hole 46 will not ordinarily be properly centered and such proper centering cannot be obtained by sight. Thus if the plug 21 upon being lowered into the hole 46 is in close contact with the wall of the hole 46, over a substantial area, there will in effect be a closed circuit between the point 38 and 39 with a certain amount of resistance. The greater the area of contact between the walls of the plug 21 and the walls of the hole 46 the less resistance there is offered between these contacts 38 and 39. Consequently a greater proportionate amount of current will flow between the points 38 and 49 reducing the full scale reading on the milliammeter 36. As the plug is moved away from the wall 46 there is less area of contact between the wall 46 and the plug 21, which will increase the resistance between the points 38 and 39. Conversely as this resistance increases, the flow of current through these contacts 38 and 39 is correspondingly reduced and there is a corresponding increase in flow of current through the milliammeter 36. When the plug 21 is completely free and spaced from the walls of the hole 46, there will be no deflection on the milliammeter 36.

As the amount of deflection is reduced, a more sensitive reading may be obtained by turning the contact arm 33 to the contact point 31'. In this case, there is a smaller amount of voltage impressed upon the milliammeter 36 and there is in addition, a greater amount of current flowing through the milliammeter 36 with respect to the shunt resistance 41. Thus any contacts between the wall of the plug 21 and the walls of the hole 46 will show a greater deflection on the milliammeter scale than when the contact arm 33 was connected to the terminal 30'. A still further sensitive reading may be obtained by turning the contact arm 33 to the terminal 32' in which case, when the circuit through the contact points 38 and 39 is open, the full current passing through the rheostat 34 will be shunted across the milliammeter 36. This latter sensitivity may by proper adjustment of the resistances and other elements of the circuit, permit proper alignment of a plug, between .001" and .0015" smaller than the hole in which it is placed, to within .0005 inch of the center of the hole.

After the plug has been aligned with the axis of the die hole, it may be removed from the spindle and replaced with a drill. The female die may then be taken from above the steel plate to permit the desired and properly located hole to be drilled in the plate.

In Figure 2, there is generally illustrated a drill press such as may be used in connection with the present invention. The spindle 47 is positioned and supported in the frame 48 by journals 49 and ball bearing races 50. These ball bearing races 50 containing the ball bearings 51, are ordinarily lubricated with a thin oil which has insulating properties. Thus as previously pointed out, upon rotation of the spindle 47 the film of oil passes between the ball bearings 51 and the spindle 47 effectively insulating it from the remaining portion of the drill press permitting the proper operation as pointed out above.

There is also shown in this figure and in Figures 3 and 5 a modified form of the brush assembly. In this modified form, the band 53 secured to the housing 60 is held in position by tightening the nuts 54. To this band 53 is secured a clamp 55 by means of a nut and bolt 56. This clamp 55 secures in position two downwardly extending insulated plates 57 which support at their lower end the leaf spring 58 by means of the nut and bolt 59. This spring leaf 58 which is secured at its center has two brush arms 58a and 58b pressed in electrical contact with the spindle.

Occasionally there are some machines, useful in the present invention which have their bearings lubricated with a conductive material. In such cases, the preferred modification described above cannot be used because there would then be a continuous ground created through the bearing. Under these circumstances the present invention may be modified to include a centering plug mounted in a phenolic or other insulating sleeve. This sleeve would effectively insulate the plug from the spindle and other portions of the machine. A separate contact having a spring pressed brush would engage the side of the centering plug projecting from the insulating sleeve. Although the specification set forth above described the present invention as used in connection with a drill, it should be understood that this invention may be used with any type of spindle equipment including a drill press or lathe. It may also be used to locate the exact center of a pin or projection by merely replacing the plug 21 with a sleeve having an inside diameter hole .001 inch to .0015 inch larger than the outside diameter of the plug or pin under examination.

The principles set forth above may also be employed to measure the electrical capacity in micro-microfarads between the centering plug and the sides of the hole requiring centering. A minimum capacity in the circuit such as described after the plug has been centered in the hole, indicates an exact centering.

Having now described my invention, I claim:

1. A means for accurately locating the center of a hole in a conductive material comprising a conductive axially rotatable pin having a diameter slightly smaller than the diameter of said hole, means for axially rotating said pin, means for adjustably positioning said pin while axially rotating in said hole, and means responsive to the electrical resistance between said axially rotating pin and conductive material for indicating that the pin is centered in the hole.

2. A means for accurately locating the axis of a pin in a conductive material comprising a conductive member having walls forming a recess of slightly larger diameter than the pin and adapted to fit over said pin, means providing relative axial rotation between said pin and walls, means for adjustably radially positioning said walls about said pin, an electrical circuit including the conductive member and the pin in series, and means responsive to the resistance between the pin and the member for indicating that the pin is centered in said recess.

3. A means for accurately locating the center of a hole in a conductive material comprising a conductive pin, said hole having a diameter substantially no more than .0015" greater than the diameter of the pin, means for adjustably radially positioning the pin in said hole, means for axially rotating said pin, an electric circuit including said pin and conductive material providing an electrical resistance inversely proportional in magnitude to the area of contact between said pin and material, and a meter electrically connected to said circuit adapted to indicate relative amounts of current passing through said resistance whereby the radial location of said pin for maximum resistance may be determined.

4. In combination with a machine having a ball bearing mounted rotatable spindle with said ball bearing lubricated with a nonconductive lubricant; electrical circuit means for accurately locating the center of a hole in a conductive material comprising a conductive pin having a diameter slightly smaller than the diameter of the hole secured to said spindle and adapted to be electrically insulated from said machine on rotation of the spindle, means for adjustably radially positioning the pin in the hole, and means responsive to the electrical resistance between the pin and the conductive material for indicating that the pin is centered in the hole.

5. A means for accurately aligning the axis of a cylindrical recess in a conductive material with a conductive cylindrical axially rotatable plug of a diameter substantially no less than .0015" smaller than the diameter of said recess comprising means forming an electric circuit having two terminals, one terminal contacting the plug and the other the conductive material, means for rotating said plug about its axis, means for moving said plug radially in said recess, and an electrical meter connected across said terminals and responsive to the resistance between the plug and the conductive material rendering a measurement which is a direct function of the resistance whereby a maximum measurement is approached when the axis of the plug is moved towards the axis of the recess.

6. In combination with a machine having a ball bearing mounted spindle with said ball bearing lubricated with a nonconductive lubricant; means for accurately aligning the axes of a conductive plug and a hole of slightly larger diameter in a conductive material comprising means for varying the relative positions of the plug and the conductive material, a power supply connected across the material and the plug, means having a variable resistance in series with the power supply and the plug, and an ammeter connected across the power supply and the variable resistance and in parallel with the plug and conductive material, said meter being responsive to the resistance between the plug and the material.

7. Apparatus for centering a rotatable spindle over an opening defined by a wall electrically insulated from said spindle comprising means for radially moving said spindle relative to said wall, an electric circuit having a pair of electrical terminals, means for electrically connecting one of said terminals to the spindle and the other of said terminals to the wall whereby the minimum area between the area of contact of the spindle and wall forms a variable resistance between the terminals, said resistance being maximum when the spindle is centered in the recess, means for applying a potential across the terminals, a second circuit connected in parallel with the terminals, and means for measuring current through said second circuit, said last mentioned current increasing when said variable resistance increases and reaching a maximum when said variable resistance is maximum.

8. Apparatus of the class described in claim 7, further characterized by said means for connecting one of the terminals to the spindle being a contact brush assembly.

9. Means for accurately locating the center of a hole in a conductive material comprising a conductive pin, said hole having a diameter substantially no more than .0015" greater than the diameter of the pin, means for adjustably radially positioning the pin in said hole, means for axially rotating said pin, an electric circuit including said pin and conductive material providing a path having an electrical resistance inversely proportional in magnitude to the distance between the axes of said pin and said hole, and means electrically connected to said path to indicate relative amounts of current passing through said path whereby said axes may be substantially coincidently aligned by locating said pin for a reading indicative of minimum current through the path.

10. In combination with a machine having a ball bearing mounted rotatable spindle with said ball bearing lubricated with a nonconductive lubricant; means for accurately locating the center of a hole in a conductive material comprising a conductive pin having a diameter slightly smaller than the diameter of the hole secured to said spindle, means for adjustably radially positioning the pin in the hole, an electrical circuit having a terminal adapted to be connected to said conductive material and a terminal connected to said spindle providing an electrical path between said pin and material having a resistance inversely proportional in magnitude to the relative distances between the axis of said pin and the axis of said hole, and means electrically connected to said path to indicate relative amounts of current passing through said path whereby said axes may be substantially coincidently aligned by locating said pin for a reading indicative of minimum current through the path.

11. Apparatus as defined in claim 10 characterized by said last named means comprising an ammeter connected across the terminals and parallel to the electrical path.

12. Apparatus as defined in claim 11 further characterized by means for varying the electrical potential across the electrical path, and a plurality of shunt resistors adapted to be selectively connected across the terminals and parallel to the ammeter for varying its sensitivity.

13. Apparatus as defined in claim 11 further characterized by a plurality of resistors adapted to be selectively connected in the circuit in series with the electrical path for varying the potential across the path, a plurality of shunt resistors adapted to be selectively connected across the terminals and parallel to the electrical path for varying the sensitivity of the ammeter, and a gang switch for selectively introducing one each of the plurality of resistors and shunt resistors into the circuit.

14. Means for centering a pin in a hole formed in a conductive material and wherein the diameter of the hole is slightly larger than the diameter of the pin comprising means for axially rotating the pin in the hole, means for moving the rotating pin radially in the hole, an electrical circuit having one terminal electrically connected to the pin and a second terminal electrically connected to the conductive material, said pin and material providing a variable electrical resistance in the circuit inversely proportional in magnitude to the area of contact between the pin and the material, means for energizing the circuit, an ammeter connected in said circuit across the terminals and rendering a reading proportional to the magnitude of the variable resistance, a plurality of parallel resistors adapted to be selectively introduced in series with the variable resistance for varying the potential between the pin and the material, and shunt resistors adapted to be selectively connected across the terminals for varying the sensitivity of the ammeter.

References Cited in the file of this patent

UNITED STATES PATENTS

| | | |
|---|---|---|
| 1,826,247 | Heppenstall | Oct. 6, 1931 |
| 1,898,133 | Leibe | Feb. 21, 1933 |
| 2,072,510 | Moloney | Mar. 2, 1937 |
| 2,256,120 | Lovenston | Sept. 16, 1941 |
| 2,553,129 | Burnett | May 15, 1951 |